United States Patent [19]
Reda et al.

[11] Patent Number: 5,257,297
[45] Date of Patent: Oct. 26, 1993

[54] SYSTEM FOR MONITORING THE RADIOACTIVITY OF LIQUID WASTE

[75] Inventors: Ralph J. Reda; Frank W. Cloudman, Jr., both of Wilmington; Ralph K. Furches, Leland; Ronald V. Ryan; Joel L. Pickett, both of Wilmington, all of N.C.

[73] Assignee: General Electric Company, San Jose, Calif.

[21] Appl. No.: 820,464

[22] Filed: Jan. 14, 1992

[51] Int. Cl.⁵ ............................................ G21C 19/46
[52] U.S. Cl. ...................... 376/310; 376/308; 376/257; 376/158; 376/159; 250/435; 250/430; 252/626; 252/631
[58] Field of Search ............... 376/308, 309, 310, 257, 376/158, 159; 252/631, 626; 250/432 R, 435, 430

[56] References Cited

U.S. PATENT DOCUMENTS

| | | | |
|---|---|---|---|
| 3,182,193 | 5/1965 | Ellner et al. | 250/43.5 |
| 3,849,655 | 11/1974 | Martucci | 250/366 |
| 3,953,737 | 4/1976 | Neeb et al. | 250/432 R |
| 4,507,390 | 3/1985 | Horiuchi et al. | 436/161 |
| 4,582,992 | 4/1986 | Atwell et al. | 250/359.1 |
| 4,587,043 | 5/1986 | Murray et al. | 252/626 |
| 4,591,716 | 5/1986 | Kitaguchi et al. | 250/336.1 |
| 4,792,385 | 12/1988 | Snyder et al. | 204/140 |
| 5,014,368 | 5/1991 | Lehmann | 4/314 |
| 5,055,237 | 10/1991 | Husseiny | 252/631 |

*Primary Examiner*—Donald P. Walsh
*Assistant Examiner*—Chrisman D. Carroll
*Attorney, Agent, or Firm*—John S. Beulick

[57] ABSTRACT

A system for monitoring the radioactivity of a liquid waste stream includes a pair of tanks into which the liquid waste stream is directed during alternating fill cycles. At the conclusion of each fill cycle, the liquid waste is recirculated through the chamber of a radioactivity monitor. A pair of opposed radiation detectors, external to the chamber, generate activity measurements to a controller indicative of the radionuclide concentration levels in the liquid waste. The tanks are then emptied either to the environment or back to a decontamination facility for further processing depending on the indicated radionuclide concentration level. System operation, including periodic servicing of the monitor, is automatically coordinated by the controller to avoid interruption of the liquid waste stream filling the tanks.

14 Claims, 4 Drawing Sheets

SYSTEM FOR MONITORING THE RADIOACTIVITY OF LIQUID WASTE

The present invention relates to radioactivity monitoring systems and particularly to systems for assaying the concentration of radionuclides in a liquid waste stream.

BACKGROUND OF THE INVENTION

In nuclear facilities such as nuclear fuel processing plants, constant vigil is required to prevent the inadvertent discharge of radioactive wastes into the surrounding environment. The possible presence of radioisotopic particles in liquid waste streams is of particular concern. The release of even very low level radioactive liquid waste constitutes an environmental hazard. Thus, the liquid waste stream must be assayed to detect the presence of extremely low concentrations of radionuclides. Radioactivity monitoring has been accomplished by taking random samples of the liquid waste stream and testing for the presence of radionuclids in a laboratory. If the flow of liquid waste is continuous, significant quantities of potentially radioactive liquid waste can be discharged into the environment during the intervals between random tests. This approach is therefore unacceptable.

Thus to satisfy regulatory standards, the liquid waste stream must be monitored for radioactivity on a 100% basis. If the volumetric flow of the liquid waste stream is large, reliable 100% testing can pose a significant bottleneck to efficient plant operation. Continuous radioactivity monitoring of the liquid waste as it is being discharge into the surrounding environment may require that the flow rate be throttled down to ensure requisite accuracy. Alternatively, the liquid waste may be accumulated in holding tanks, and samples are taken from the tanks for laboratory testing. The tanks are then discharged if the concentrations of radionuclides are found to be acceptably low. This approach certainly satisfies the 100% testing criteria and is reliable if the tested samples accurately represent the compositions of liquid waste in the holding tanks. However, it is not particularly expeditious. Thus, so as not to curtail plant operations, numerous large holding tanks are required to keep up with a waste stream of significant volumetric flow rate.

SUMMARY OF THE INVENTION

It is accordingly an objective of the present invention to provide a system for accurately monitoring the radioactivity of a liquid waste stream on a 100% basis in an efficient and expeditious manner. To this end, the system of the present invention includes a pair of holding tanks which are filled from the liquid waste stream during alternating fill cycles. At the conclusion of each fill cycle, the liquid waste in one tank is recirculated through the monitoring chamber of a radioactivity monitor during a monitoring period while the other tank is undergoing its fill cycle. A detector external to the chamber generates a succession of radioactivity measurements indicative of the radionuclide concentration of the liquid waste recirculating through the chamber. If the concentration level is acceptable, the liquid waste in each tank can be safely discharged to the environment. If not, the liquid waste is discharged back to a decontamination facility for further processing.

The radioactivity monitor preferably includes a pair of radiation detectors situated on opposite sides of a monitoring chamber of rectangular cross section. Detector responses are calibrated by momentary exposure to separate pairs of radioactive sources. The detector responses to the known activities of these reference sources are utilized to establish calibration coefficients necessary to convert detector radioactivity measurements into radionuclide concentrations at the conclusion of each monitoring period.

System operation is coordinated by a controller which processes the detector responses and automatically positions valves to direct the liquid waste stream to the tanks and recirculate liquid waste through the radioactivity monitor in alternative fashion. The controller also establishes a monitor service period following each monitoring period during which detector calibration is performed, background radiation is checked and distilled water and acid flushes of the monitoring chamber are instituted when called for.

The invention accordingly comprises the features of construction, combination of elements, arrangement of parts, and the method for operating same, all as detailed hereinafter, and the scope of the invention will be indicated in the claims.

BRIEF DESCRIPTION OF THE DRAWINGS

For a full understanding of the nature and objects of the present invention, reference may be had to the following Detailed Description taken in conjunction with the accompanying drawings, in which.

Corresponding reference numerals refer to like parts through out the several views of the drawings.

DETAILED DESCRIPTION

Figure 1:
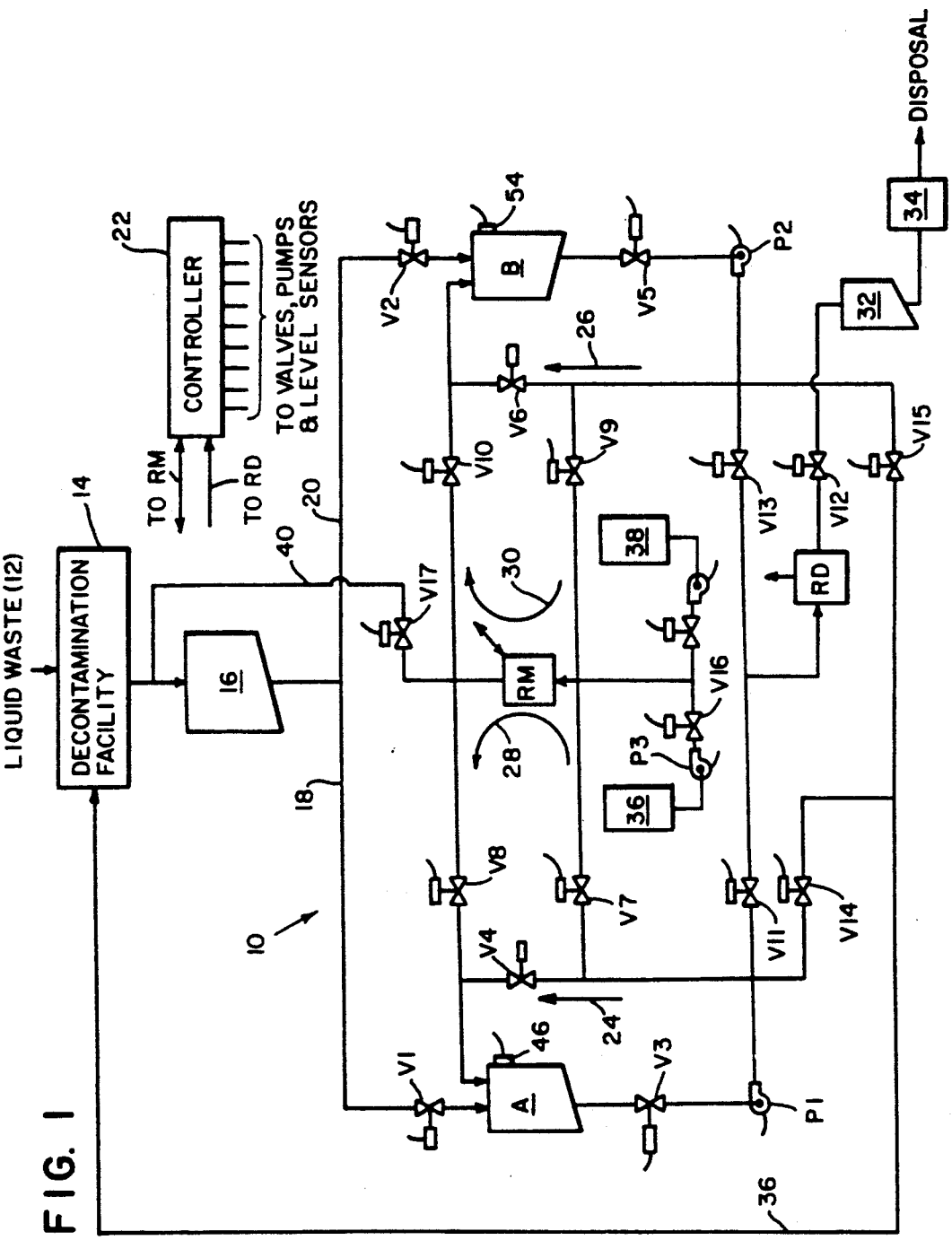
FIG. 1 is a schematic diagram of a liquid waste radioactivity monitoring system constructed in accordance with the present invention.

The liquid waste radioactivity monitoring systems of the present invention, generally indicated at 10 in FIG. 1, is utilized to continuously assay the isotopic concentration of an aqueous waste stream 12 after it has been processed by a decontamination facility 14 to remove radionuclide particles. This facility is of conventional design, utilizing a series of extraction, scrub and strip columns for treating the liquid waste stream 12 to reduce its isotopic concentration to an acceptably low level, e.g., less than twenty parts per million (ppm) uranium. The liquid waste stream exits facility 14 to a holding tank 16, whose outlet is connected by a conduit 18 and a solenoid valve V1 to an inlet of a tank A and by a conduit 20 and a solenoid valve V2 to an inlet of a tank B. As described below, the treated liquid waste in tank 16 is drained to fill tanks A and B during alternating fill cycles as valves V1 and V2 are appropriately opened and closed by a controller 22.

As tank A is being filled, solenoid valves V3 and V4 are opened and pump P1 is activated by controller 22 to establish a liquid waste recirculating conduit loop (arrow 24) from outlet to inlet of tank A. Similarly, as tank B is being filled, solenoid valves V5 and V6 are opened and pump P2 is activated by the controller to establish a liquid waste recirculating conduit loop (arrow 26) from outlet to inlet of tank B. By pumping the liquid waste through these recirculating loops as tanks A and B are being filled from holding tank 16, a uniform dispersion of radionuclide particles in the liquid waste contained in these tanks is assured. To assay the isotopic or radionuclide concentration of the liquid waste in tank A, valve V4 is closed, and valves V3, V7 and V8 are opened by the controller. Pump P1 then pumps the contents of tank A from outlet to inlet through a recirculation conduit loop (arrows 28) which includes a radioactivity monitor RM. Then, to assay the isotopic concentration of the liquid waste in tank B, valve V6 is closed, and valves V5, V9 and V10 are opened by the controller. Pump P2 then pumps the contents of tank B from outlet to inlet through a recirculation conduit loop (arrow 30) which also includes radioactivity monitor RM.

While liquid waste is being pumped through the radioactivity monitor, which is detailed below in conjunction with FIGS. 3 and 4, a pair of radiation detectors generate a succession of radioactivity measurements which are fed to the controller for analysis of radionuclide concentration. If the contents of tank A is assayed to have an acceptably low concentration, the controller opens solenoid valves V3, V11 and V12, and pump P1 is activated to empty tank A to a holding tank 32. Included in this liquid waste discharge conduit path is a radioactivity detector RD which provides radioactivity counts to the controller as a course conformation that the liquid waste is safe for disposal. From holding tank 32, the liquid waste undergoes final treatment, indicated at 34, before being discharged to the environment, such as a pond on the plant grounds. This final treatment may include the removal of trace non-radioactive elements and chemicals, adjustment of ph, etc., requisite to rendering the liquid waste environmentally safe. If the contents of tank B is assayed to have a safe radioactivity level, solenoid valves V5, V13 and V12 are opened by the controller, and pump P2 empties tank B through radioactivity detector RD to holding tank 32. From there, the tank B contents undergoes final treatment 34 and disposal.

On the other hand, if the liquid waste in tank A is determined to have an unacceptably high radionuclide concentration level, valves V3 and V14 are opened by the controller, and pump P1 pumps the contents of this tank back to decontamination facility 14 via conduit 36 for reprocessing. Similarly, if the liquid waste in tank B is assayed to have an unacceptably high radionuclide concentration level, valves V5 and V15 are opened, and its contents are pumped via conduit 36 back to facility 14 by pump P2 for reprocessing. It will be appreciated that, if reactivity detector RD should generate unacceptably high radioactivity counts from the liquid waste flowing through it to holding tank 32, the controller can automatically set the requisite valve positions to reroute the liquid waste back to the decontamination facility.

The radioactivity monitoring system 10 also includes a distilled water (DI) holding tank 38 and an acid flush holding tank 36. During intervals when liquid waste is not being recirculated through monitor RM, the controller will call for an acid flush to dissolve any radioactive contaminates that are found to have accumulated over time in the monitor chamber. It will be appreciated that the presence of such contaminants produces background radioactivity which cause erroneous concentration readings when liquid waste is being pumped through the monitor. Thus, to flush the monitor chamber with acid, the controller opens solenoid valves V16 and V17 and activates pump P3. Nitric acid is then pumped from tank 36 through the monitor chamber and conduit 40 to holding tank 16. An acid flush is always followed by a distilled water flush, and thus the controller opens valves V18 and V17 and activates pump P4 to pump distilled water from tank 38 through the monitor chamber and conduit 40 to holding tank 16. Periodically, e.g., after every seven fills and dumps of tanks A and B, the controller will check the background radioactivity seen by the detectors in monitor RM. During these background checks, the controller will institute a distilled water flush.

Figure 2:
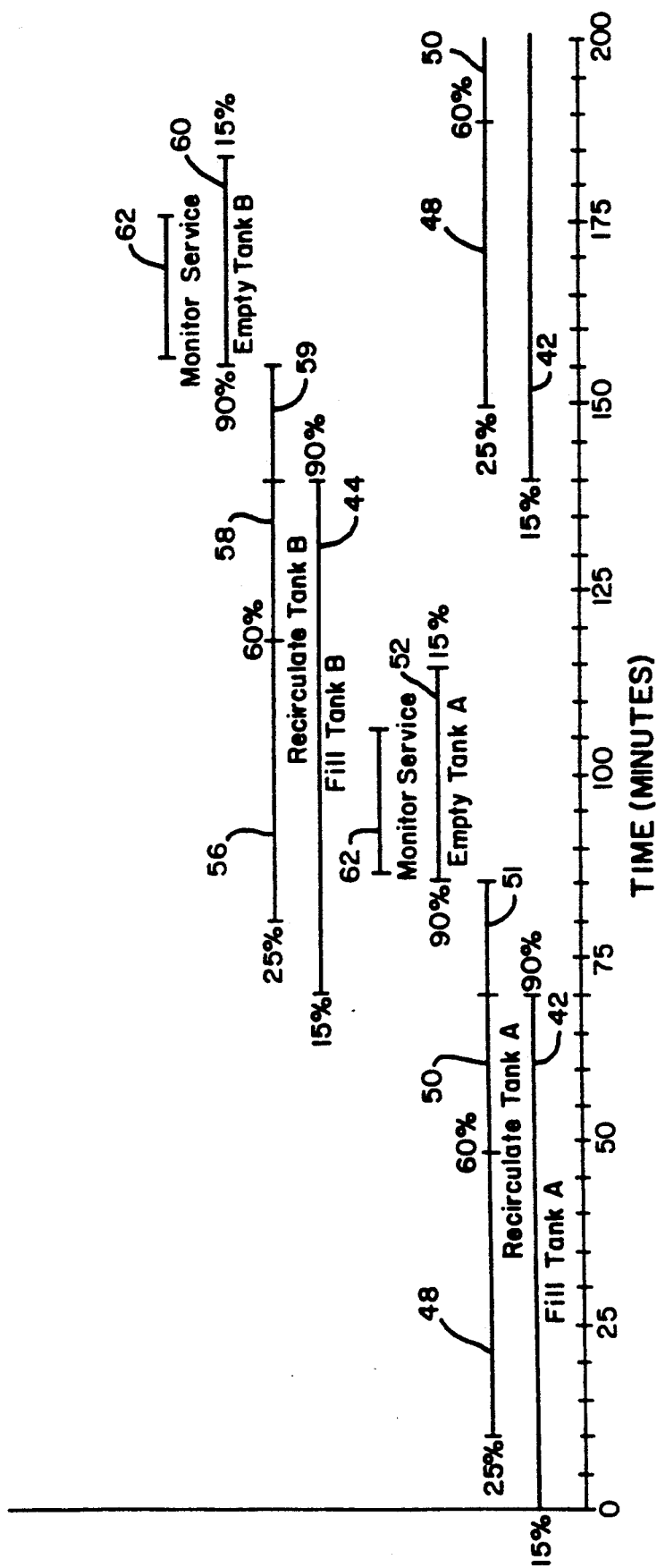
FIG. 2 is a timing diagram illustrating the operation of the monitoring system of FIG. 1.

The timing diagram of FIG. 2 illustrates the operation of radioactivity monitoring system 10 as orchestrated by controller 22. Time line 42 represents the fill cycle period for tank A, while time line 44 represents the fill cycle period for tank B. When tank A is 25% full, as signalled by level sensor 46 in FIG. 1, at approximately the 10 minute mark, the controller establishes recirculation conduit loop 24 for the interval represented by time line 48 to ensure a uniform dispersion of radionuclides in the liquid waste stream filling tank A. When tank A is approximately 60% full, the controller valves off recirculation loop 24 and opens recirculation loop 28 through radioactivity monitor RM for the interval represented by time line 50. As tank A continues to fill, periodic radioactivity measurements are fed to the controller, not for assaying purposes, but merely as an indication of system operation and to alert an operator in the event of high radioactivity measurements. When tank A is filled to 90%, the fill cycle for this tank is terminated, and the fill cycle for tank B, represented by time line 44, is initiated by the controller with virtually no interruption in the liquid waste stream draining from holding tank 16. The recirculation of the liquid waste in tank A through the radioactivity monitor RM is continued for a 15 minute monitoring period, represented by time line 51, after termination of its fill cycle. A succession of 15 one minute radioactivity counts is accumulated by the controller and averaged to determine the radionuclide concentration in the liquid waste content of tank A. At the conclusion of the monitoring period, tank A is emptied, during the interval represented by time line 52, either to holding tank 32 if the radionuclide concentration is acceptable, or back to decontamination facility 14 if it is not.

Tank B is handled in the same fashion as tank A. Thus, when tank B is filled to the 25% level, its level detector 54 signals the controller to open recirculation loop 26 (time line 56) and at the 60% level to convert to recirculation loop 30 (time line 58) through the radioactivity monitor. Radioactivity count readings are taken as the tank B fill cycle continues to the 90% level for system operation monitoring purposes and for a 15 minute radioactivity monitoring period thereafter (time line 59) for radionuclide concentration assaying purposes. Upon completion of the fill cycle for tank B, the fill cycle for tank A starts at the 140 minute mark, as indicated by the second time line 42. At the conclusion of this monitoring period, tank B is emptied during the interval represented by time line 60 either to holding tank 32 or back to decontamination facility 14, depending on the assay results. It will be noted that tanks A and B are filled to 90% to preclude inadvertent overflow and are discharged down to 15% to guard against cavitation of pumps P1 and P2.

As seen in FIG. 2, while tanks A and B are being emptied and before liquid waste is circulated through radioactivity monitor RM, a 20 minute period, represented by time lines 62, is allotted for monitor service. This service includes calibrating the monitor detector responses, checking the background reactivity level, and acid and distilled water flushes. The periodic background reactivity level check is accompanied by a distilled water flush. If the controller finds the background radioactivity level to be high, evidencing an accumulation of radioactive contaminants in the monitor chamber, one or more acid flushes are performed, followed by a distilled water flush in each case. The calibration step, accompanied by a distilled water flush, is performed prior to each system start-up and periodically thereafter, e.g., after sixty tank fill cycles. Recalibration may also be done after an acid flush.

It will be appreciated that the time lines and marks illustrated in FIG. 2 are merely exemplary, since the fill cycle times will vary depending on the liquid waste stream volumetric flow rate and tank capacity. The other time periods can be adjusted to accommodate these variables.

Figure 3:
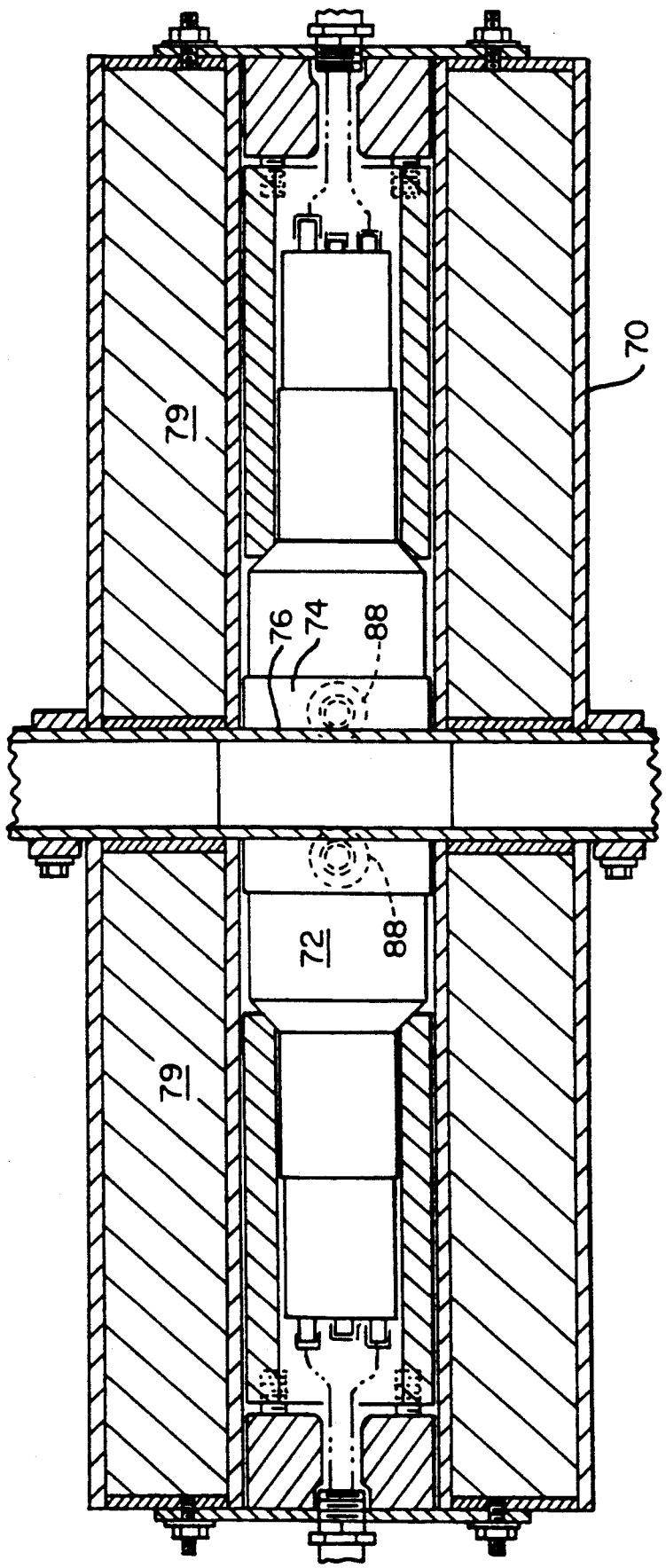
FIGS. 3 and 4 are longitudinal sectional views of a radioactivity monitor utilized in the monitoring system of FIG. 1.
Figure 4:
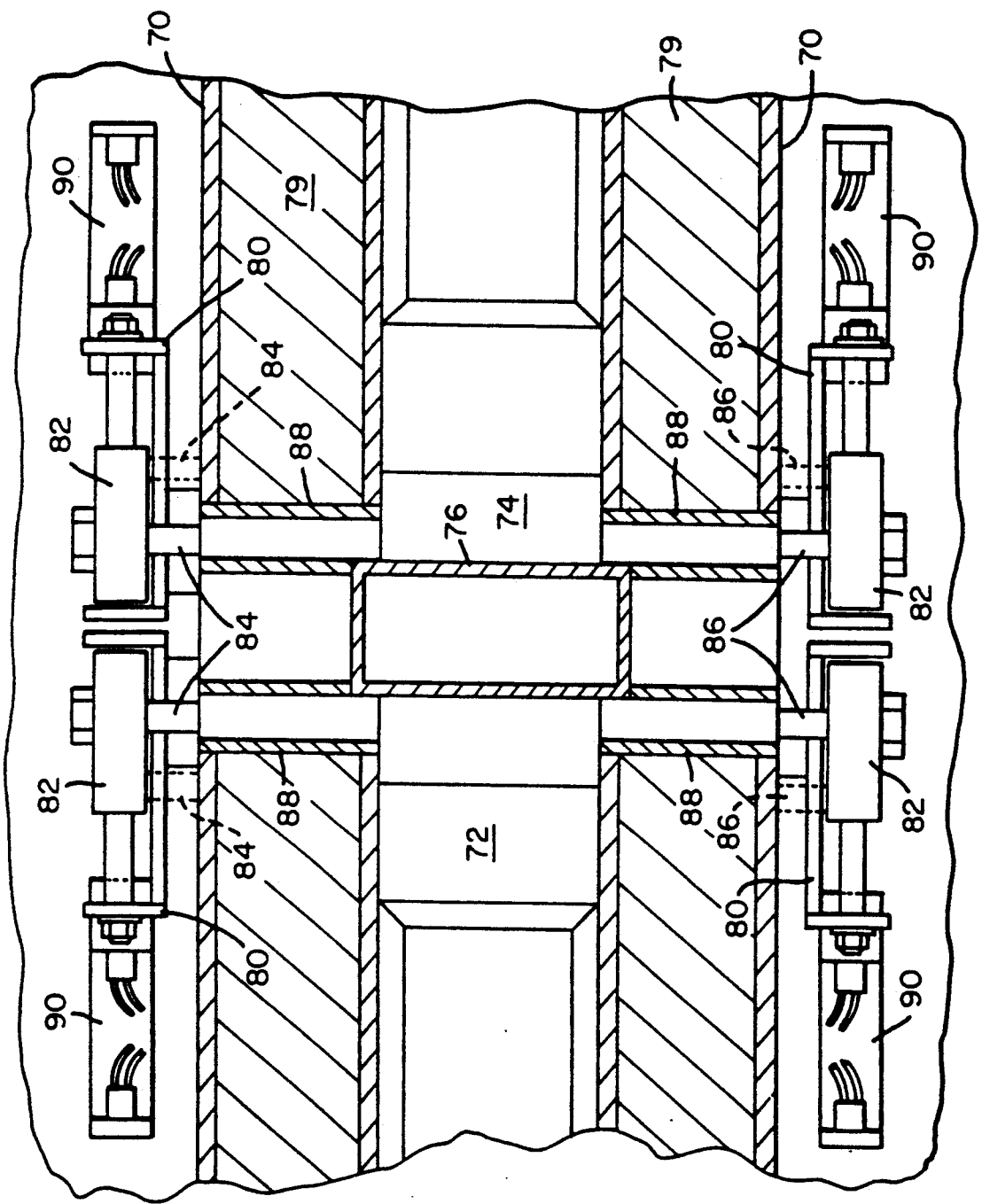

Turning to FIGS. 3 and 4, radioactivity monitor RM includes a housing 70 containing a pair of radiation detectors 72 and 74 disposed in confronting relation on opposite sides of a monitor chamber 76 through which the liquid waste is recirculated via conduit loops 28 and 30 (FIG. 1). The detectors may be standard sodium iodide-thallium scintillation detectors. While a single detector may be used, a pair of detectors affords enhanced sensitivity. The detectors are surrounded by lead shieldings 79 to minimize responses to spurious background radioactivity. As seen in FIG. 4, the cross section of monitor chamber 76 is preferably rectangular, such that the planar faces of detectors 72 and 74 can be positioned in flush relation against the outer surfaces of opposed chamber sidewalls.

Referring specifically to FIG. 4, slidingly mounted to each side of monitor housing 70 are a pair of brackets 80, each carrying a casing 82 for a reference radioactive source. Thus, the casings to one side of the monitor housing have sources 84 of a known relatively high activity, while the casings to the other side of the monitor housing have sources 86 of a known relatively low activity. These references sources are shown in FIG. 4 in their calibrating positions respective aligned with the open outer ends of transverse tubes 88 whose inner ends are in open communication with detectors 72 and 74. Each bracket is longitudinally reciprocated by a separate linear actuator 90, such as an air cylinder, to shift the references sources between their solid line calibrating positions and their phantom line retracted position essentially isolated from the detectors, all under the control of controller 22 (FIG. 1).

To calibrate the system, the low activity sources 86 are shifted to their calibrating positions aligned with tubes 88, and a one minute count of the detector responses to the low activity sources is accumulated by the controller. The low activity sources are retracted, and, after a suitable delay, the high activity sources 84 are shifted from their retracted positions to their calibrating positions. A one minute count of the detector responses to the high activity sources 84 is accumulated by the controller. With these readings, the controller can calculate calibration coefficients necessary to covert radioactivity counts generated by the detectors during the liquid waste radioactivity monitoring periods to radionuclide concentrations.

It is seen from the foregoing that the objectives of the present invention set forth above, including those made apparent from the preceding Detailed Description are efficiently attained, and, since certain changes may be made in the construction set forth and the operational mode thereof without departing from the scope of the invention, it is intended that matters of detail be taken as illustrative and not in a limiting sense.

Having described the invention, what is claimed as new and desired to secure by Letter Patent is:

1. A system for monitoring a liquid waste stream for the presence of radionuclides, said system comprising, in combination:
   A. first and second tanks;
   B. a first external conduit loop connected with said first tank for recirculating the contents thereof;
   C. a second external conduit loop connected with said second tank for recirculating the contents thereof;
   D. intake and discharge conduits connected with said first and second tanks;
   E. a radioactivity monitor having a chamber connected into said first and second conduit loops and at least one detector positioned externally of said chamber to respond to radiation emitted by radionuclides in liquid waste recirculating through said chamber and said first and second conduit loops;
   F. remotely operated valves included in said intake and discharge conduits and in said first and second conduit loops;
   G. a controller operatively connected to said valves and electrically connected to said detector, said controller selectively positioning said valves to direct the liquid waste stream to fill said first and second tanks, to recirculate the liquid waste through said first and second conduit loops and said monitor chamber, and empty said first and second tanks, all in alternating fashion, said controller receiving radioactivity measurement responses of said detector while liquid waste flows through said chamber to determine therefrom the radionuclide concentrations therein; and
   H. third and fourth tanks, said third tank containing distilled water and said fourth tank containing an acid, said controller initiating distilled water and acid flushes of said monitor chamber during periods when no liquid waste is being recirculated therethrough.

2. A system for monitoring a liquid waste stream for the presence of radionuclides, said system comprising, in combination:
   A. first and second tanks;
   B. a first external conduit loop connected with said first tank for recirculating the contents thereof;
   C. a second external conduit loop connected with said second tank for recirculating the contents thereof;
   D. intake and discharge conduits connected with said first and second tanks;
   E. a radioactivity monitor having a chamber connected into said first and second conduit loops, said chamber having a flat wall section, and at least one detector positioned externally of said chamber and having a planar face situated in substantially flush relation with said flat wall sections, said detector responding to radiation emitted by radionuclides in liquid waste recirculating through said chamber and said first and second conduit loops, said radioactivity monitor further including a reference radioactive source and an actuator for shifting said reference source between a calibrating position exposed to said detector and a retracted position isolated from said detector;

F. remotely operated valves included in said intake and discharge conduits and in said first and second conduit loops; and G. a controller operatively connected to said valves and electrically connected to said detector, said controller selectively positioning said valves to direct the liquid waste stream to fill said first and second tanks, to recirculate the liquid waste through said first and second conduit loops and said monitor chamber, and empty said first and second tanks, all in alternating fashion, said controller receiving radioactivity measurement responses of said detector while liquid waste flows through said chamber to determine therefrom the radionuclide concentrations therein, and said controller activating said actuator to shift said reference source to said calibrating and retracted position.

3. The system defined in claim 2, wherein said radioactivity monitor includes first and second radiation detectors having planar faces, and said chamber having opposed flat wall sections against which said planar faces of said first and second detectors are situated in opposed relation.

4. The system defined in claim 3, wherein said radioactivity monitor further includes a first pair of reference radioactive sources of high activity and a second pair of reference radioactive sources of low activity, said controller shifting said first and second pairs of references sources from retracted positions successively into calibrating position exposed to said first and second detectors during a period when no liquid waste is being recirculated through said monitoring chamber, whereby the responses of said first and second detectors to said reference sources enable said controller to establish calibration coefficients for converting detector responses to radionuclide concentrations during recirculation of liquid waste through said chamber.

5. The system defined in claim 4, which further includes a third tank containing distilled water and a fourth tank containing an acid, said controller initiating distilled water and acid flushes of said chamber during periods when no liquid waste is being recirculated therethrough.

6. A method for monitoring the radioactivity of a liquid waste stream on an automated basis, said method comprising the steps of:

A. alternately directing the liquid waste stream into a first tank during a first fill cycle and into a second tank during a second fill cycle;

B. recirculating the liquid waste in said first tank through a chamber of a radioactivity monitor during each said second fill cycle;

C. recirculating the liquid waste in said second tank through said radioactivity monitor chamber during each said first fill cycle;

D. assaying the radionuclide concentration of the liquid waste in said first tank recirculating through said radioactivity monitor chamber during a first monitoring period following the completion of each said first fill cycle;

E. emptying said first tank during each said second fill cycle selectively through either of first and second discharge conduits depending upon whether the assayed liquid waste radionuclide concentration in said first tank is above or below an acceptable level;

F. assaying the radionuclide concentration of the liquid waste in said second tank recirculating through said radioactivity monitor chamber during a second monitoring period following the completion of each second fill cycle;

G. emptying said second tank during each said first fill cycle selectively through either of said first and second discharge conduits depending upon whether the assayed liquid waste radionuclide concentration in said second tank is above or below said acceptable level; and H. servicing said radioactivity monitor during a service period immediately following each said first and second monitoring period when no liquid waste is being recirculated through said radioactivity monitor.

7. The method defined in claim 6, wherein said servicing step includes checking the level of background radiation sensed by a radiation detector in said radioactivity monitor.

8. The method defined in claim 7, wherein said servicing step includes flushing said radioactivity monitor chamber with distilled water during said background radiation checking step.

9. The method defined in claim 8, wherein said servicing step further includes flushing said radioactivity monitor chamber with acid when the background radiation level exceeds a predetermined limit.

10. The method defined in claim 9, wherein said servicing step further includes momentarily exposing said detector in said radioactivity monitor to at least one reference radioactive source pursuant to calibrating the detector response to radionuclide concentrations in the liquid waste.

11. The method defined in claim 11, which further includes the steps of recirculating the liquid waste in said first tank through a first external conduit loop bypassing said radioactivity monitor during each said first fill cycle, and recirculating the liquid waste in said second tank through a second external conduit loop bypassing said radioactivity monitor during each said second fill cycle.

12. The method defined in claim 11, which further includes the steps of diverting liquid waste recirculation from said first conduit loop to said radioactivity monitor during a concluding interval of each said first fill cycle, and diverting liquid waste recirculation from said second conduit loop to said radioactivity monitor during a concluding interval of each said second fill cycle.

13. The method defined in claim 12, wherein said directing step A. alternates between said first and second fill cycles without significant interruption of the liquid waste stream.

14. The method defined in claim 13, wherein said servicing step includes at least one of the steps of
 1) checking for background radiation,
 2) calibrating the radioactivity response of a detector during momentary exposure to a reference radioactive source in said radioactivity monitor,
 3) flushing said radioactivity monitor chamber with acid, and
 4) flushing the radioactivity monitor chamber with distilled water.

* * * * *